United States Patent
Eidelberg et al.

[11] 3,893,719
[45] July 8, 1975

[54] LIQUID-TIGHT SWIVEL ADAPTOR FOR ELECTRICAL CONNECTOR

[75] Inventors: Jonah Eidelberg, Huntington Station; Thomas Mooney, Mount Sinai, both of N.Y.

[73] Assignee: Electrical Fittings Corporation, East Farmingdale, New York

[22] Filed: Oct. 21, 1970

[21] Appl. No.: 82,557

[52] U.S. Cl. ............ 285/55; 174/65 R; 174/78; 174/83; 285/110; 285/158; 285/354
[51] Int. Cl. ............................................. F16l 19/00
[58] Field of Search ............ 285/55, 110, 354, 382, 285/158, 272, 161, 177; 174/65 R, 65 SS, 78, 83

[56] References Cited
UNITED STATES PATENTS

| | | | |
|---|---|---|---|
| 2,131,316 | 9/1938 | Ellis | 285/55 X |
| 2,318,112 | 5/1943 | Stillwagon | 285/354 X |
| 2,420,778 | 5/1947 | Herold | 285/354 X |
| 2,947,800 | 8/1960 | Badeau et al. | 174/65 R X |
| 3,052,748 | 9/1962 | Curtiss | 174/65 R X |
| 3,151,775 | 10/1964 | Whitehead | 285/55 X |
| 3,338,597 | 8/1967 | Mason | 285/177 X |
| 3,493,672 | 2/1970 | Bromberg | 285/161 X |

FOREIGN PATENTS OR APPLICATIONS

| | | | |
|---|---|---|---|
| 283,206 | 9/1952 | Switzerland | 174/65 R |

*Primary Examiner*—Thomas F. Callaghan
*Attorney, Agent, or Firm*—Howard C. Miskin

[57] ABSTRACT

A swivel adaptor for connecting an electrical connector to a surface with the adaptor having a tubular body member and a sleeve of rigid nylon plastic material fixedly abutting the inner surface of said bore proximate the upper end and protruding slightly beyond the upper end. The nylon sleeve has a thicker cross section adjacent the upper end. A nut having an inwardly directed collar portion is adapted to slidably fit and engage an outwardly directed radial flange on said body adjacent the upper end with the lower portion of this body being threaded for matingly being received within the threaded opening in the surface.

7 Claims, 3 Drawing Figures

3,893,719

LIQUID-TIGHT SWIVEL ADAPTOR FOR ELECTRICAL CONNECTOR

The present invention relates to a swivel adaptor and more particularly to a swivel adaptor for an electrical connector that is liquid-tight and provides a secure grounded installation at whatever the orientation of the connector that is desired.

In attaching a connector for electrical conduit containing electrical conductors, to outlet boxes, limit switches, control boxes, connections for electrical equipment or similar devices, the connector must be threaded tightly, but not too tightly or the threads would strip, with the mating threads of the control box, limit switch, outlet box, or the like, to provide the required seal and grounding. In association with many types of tools, machinery and equipment, liquids are used for lubrication, cooling, cleaning and cutting, which liquids oftentimes splashed on the electrical connections. Additionally, moisture in the air entered the conduit via the smallest opening in the connector and was condensed and trapped there, enhancing corrosion and poor electrical connections. Any liquid that worked its way into the conduit via the connector could possibly short the conductors. Further, unless the connection with the box or switch was tight, a good ground connection between the conduit to the box or ground connection was not made. Thus, it was critical that the connector had to be sufficiently tightened into the threaded receptacle. However, oftentimes, especially with angle connectors, a tight connection between the connector and the box connection could not be made, either because of a surface which interfered with the rotation of the connector, or a tight-threaded fitting, as needed above, did not occur at the desired orientation or positioning of the conduit. Thus, the installer of the connector had to back off after reaching a tight fit to achieve the desired orientation of the conduit or risk stripping the threads of the box or connector. The loosening of the connector resulted in an unsatisfactory seal and improper grounding.

Therefore, it is an object of the present invention to provide an adaptor for use with connectors, whether angled or straight, to produce a secure, liquid-tight installation with proper grounding.

A further object of the present invention is to provide a swivel adaptor which allows easy installation of electrical connectors, even where surfaces interfere with rotating the connector.

Another object of the present invention is to provide a swivel adaptor which provides a swivel adaptor which provides a liquid-tight, secure installation of a conduit at the desired orientation of the conduit.

Still another object of the present invention is to provide an adaptor for electrical connectors, which is simple in construction, one-piece to avoid any loss of parts in the field, and inexpensive to produce.

Another object of the present invention is to provide a liquid-tight swivel adaptor, which is simple to use and install, and remove and reinstall as needed.

Other features and advantages of this invention will be apparent from the following description taken in connection with the accompanying drawing, wherein.

Figure 1:
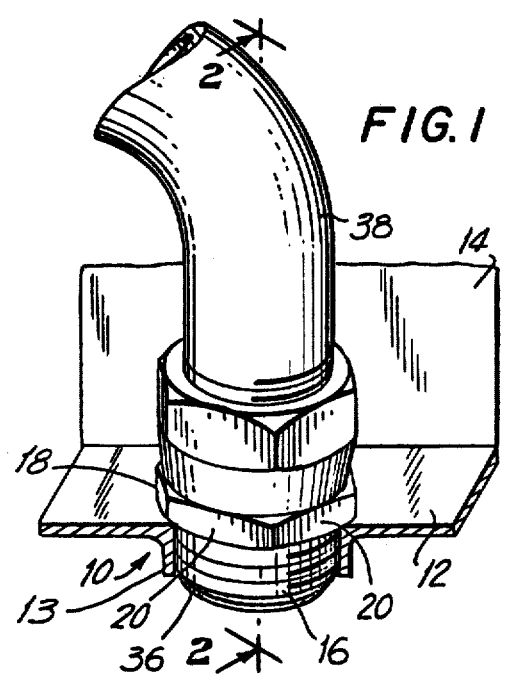
FIG. 1 is a side elevational view showing a swivel adaptor made in accordance with the present invention, mounted on an outlet box adjacent the surface on which the box is mounted.

Referring now to the drawings, a swivel adaptor 10 is shown mounted on an outlet box 12, which in turn is mounted on a surface 14. Outlet box 12 has a boss 13, which is internally threaded.

Figure 2:
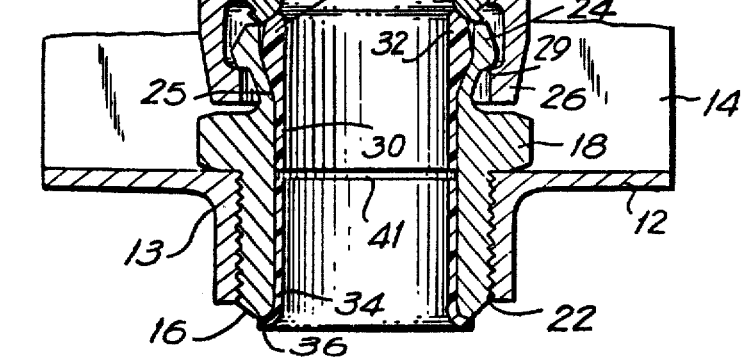
FIG. 2 is an enlarged elevational view partly in cross section, taken along line 2—2 of FIG. 1.

Referring to FIG. 2, adaptor 10 includes a generally tubular body 16, which is essentially coaxial to the passageway into box 12 and is preferably made out of steel. Body 16 has an outwardly directed radial flange 18 provided with a plurality of tool-engaging flat surfaces 20 for tightening body 16 in a manner discussed below. The outer peripheral surface of the skirt of body 16 below flange 18 is externally threaded at 22 for screwing into the mating threaded opening of boss 13, as illustrated. As shown, a tapered type of thread is shown, but other threads could be used, with a uniform pitch diameter, as well as other suitable connecting means, such as flanges, lock-nuts, or the like. The portion of body 16 above flange 18 has an outwardly displaced radial flange 24 about its peripheral edge. The internal surface of body 16 proximate to flange 24 is flared, as indicated at 25, advantageously after nut 28 is positioned coaxially to body 16. Flange 24 cooperatively engages an inwardly directed radial flange or collar 26 about the lower peripheral edge of nut 28. Nut 28 has its internal peripheral surface threaded as indicated at 27 to mate with threads on connector 38. Nut 28 is freely rotatable on body 16 and collar 26 slidably moves axially between the upper radial surface of flange 18 and the lower radial lip 29 of flange 24.

Tightly abutting the inner peripheral surface of the upper portion of body 16 is a resilient sleeve 30. Advantageously, sleeve 30 is force-fitted into the bore and retained by friction. Sleeve 30 has a radially outwardly directed portion 32 mating with flared surface 25 and the inner periphery of flange 24 on body 16. Sleeve upper portion 32 is thicker in cross-section than the lower portion of sleeve 30. Portion 32 of sleeve 30 extends slightly beyond the upper end of body 16.

Firmly positioned within the lower skirt portion of body 16 about the inner peripheral surface, is a second sleeve 34. As shown, sleeve 34 has an outwardly flared end 36 which overlaps the bottom portion of body 16. The facing ends of sleeves 30 and 34 are preferably spaced apart slightly as at 41.

It is apparent that connector 38 cannot be threaded into boss 13, since it would hit surface 14. Heretofore, box 12 had to be removed and connector 38 mounted on the box, and box 12 reassembled on surface 14. Unless by happenstance, connector 38 happened to be tightly threaded in boss 13 at the desired orientation to receive the conduit, it would have to backed off or further tightened with the possibility of stripping the threads.

For attaching the angle connector 38 to outlet box 12, swivel adaptor 10 is first threaded into boss 13 of outlet box 12, as illustrated in FIG. 2, where a tight-threaded fit is made, providing a good seal, as well as a good ground connection between body 16 and the body of outlet box 12. If necessary, wrenches or other tools can be used on the flats 20 of flange 18 to tighten the adaptor. As shown, the tapered thread of the adaptor mates with the tapered thread of boss 13 to provide the required seal and grounding. The angle connector 38 having the same thread size as the tapped hole in the outlet box 12 is positioned to engage nut 28. The lower end of connector 38 has externally threaded portions for mating with the internally threaded portions 27 of nut 28. Connector 38 is placed in the desired orientation and swivel nut 28 is tightened forcing the lower end 40 of connector 38 toward the upper end of body 16. As seen best in FIGS. 2 and 3, lower end 40 of connector 38 engages the projecting end of sleeve portion 32, and as nut 28 is continually tightened, end 40 deforms and flexes the portion 32 of sleeve 30, as seen best in FIG. 3, until end 40 engages the upper end of flange 24 of sleeve 16, making a metal-to-metal seal. The deforming and flexing portion 32 of sleeve 30 urges sleeve 30 tightly against end 40 and forms a tight seal about connector end 40, regardless of any surface irregularities or dirt. Lower sleeve 34 is preferably made of an insulating material, and forms a smooth surface for the electrical conductors or wires to avoid any rubbing or inadvertant contact with metal during movement of the conduit.

Advantageously, sleeves 30 and 34 are made of a rigid plastic, such as nylon, polypropylene, or Teflon, or the like.

Disassembly of the joint is readily accomplished by loosening nut 28, thereby loosening the connection and allowing connector 38 to be removed, and sleeve 30 to return to its unstressed, undeformed condition. If desired, connector 38 can be reassembled with no loss in sealing or grounding. Sleeve 30 is again flexed to form a tight liquid-tight seal.

Where both sleeves 30 and 34 are used, advantageously a space 41 is provided between them, so as to allow some axial movement of sleeve 30 during sealing engagement with connector end 40. If necessary, sleeve 34 can be eliminated without effecting either the seal or the ground connection.

Even if connector end 40 does not abut body 16, sleeve 30 forms a liquid-tight seal and ground is made via nut 28 and body 16 to box 12. Further, sleeve 30 formed of a rigid nylon, will maintain the seal and not creep to any significant degree.

Figure 3:
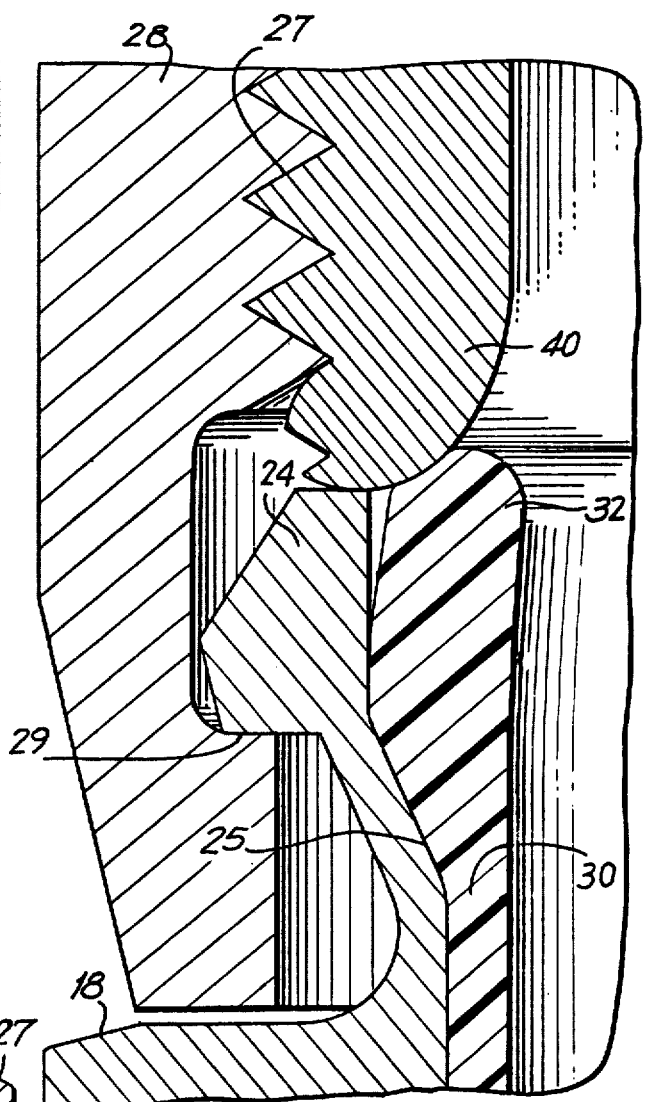
FIG. 3 is an enlarged, fragmentary portion of the adaptor of FIG. 2, showing the seal made with the connector in assembled position.

Flared surface 25 of body 16 provides a stop for sleeve 30 during engagement of sleeve portion 32 and lower end 40 of connector 38. As shown in FIG. 3, sleeve portion 32 is flexed interiorly and pivots generally about flared surface 25, and urges sleeve 30 into tight sealing engagement with the inner peripheral surface of the upper portion of body 16. Hence, during assembly, sleeve 30 sealingly engages flared surface 25 both by axial force applied by connector end 40 and the pivoting of sleeve portion 32.

While adaptor 10 was illustrated as being connected to a connector 38, other threaded fittings or conduits could be used. Thus element 38 could be a conduit, fitting, or connector. Also element 38 could take various forms and shapes. Similarly body 16 of adaptor 10 could take various shapes, and forms, and be of different lengths, such as serpentine, 90°, straight, curved or the like. When used herein, connector refers to a fitting, connector, conduit or the like.

As seen, the present invention provides both a metal-to-metal contact and a plastic-to-metal seal.

While a preferred embodiment of this invention has been specifically disclosed, it is understood that the invention is not limited thereto since many variations will be readily apparent to one skilled in the art, and the invention is to be limited only by the terms of the following claims.

What we claim is:

1. A swivel adaptor for coupling an electrical connector to a surface, comprising a tubular body having a bore therethrough and upper and lower portions, the upper portion having an outwardly directed flange and said body being outwardly flared proximate said flange, a resilient sleeve fixedly received within and abutting the surface defining the bore of said upper portion of said body, said sleeve protruding beyond the upper end of said body and positioned to engage the connector end in assembled condition and having its upper portion flexed radially inwardly by the connector end when said connector is in assembled position and said sleeve having an outwardly flared portion being forced against said body flared portion, connector coupling means for maintaining said body, connector and sleeve in assembled sealing relation and including a nut with an inwardly directed collar portion adapted to slidably fit said body upper portion and engage said flange when in connector assembled tightened condition, the inner and outer peripheral end surfaces of said connector being engaged respectively by the end peripheral faces of said sleeve and body upper portion, and means for sealingly mounting said adaptor to said surface.

2. A swivel adaptor as in claim 1, wherein said sleeve has a thicker end portion, which is radially aligned with said body flange and protrudes beyond the end of the upper portion of said body.

3. An adaptor as in claim 2, wherein said sleeve flared portion is adjacent said sleeve end portion.

4. An adaptor as in claim 2, wherein said sleeve is a rigid nylon plastic.

5. A swivel adaptor as in claim 1, wherein said surface mounting means is mating threads and seals on said body lower portion and said surface.

6. A swivel adaptor as in claim 1, further including a resilient sleeve of insulating material, fixedly received within and abutting the surface defining the bore of said body lower portion.

7. An adaptor as in claim 6, wherein the facing ends of said sleeves are spaced apart.

* * * * *